United States Patent
Dikland et al.

(10) Patent No.: US 8,304,466 B2
(45) Date of Patent: Nov. 6, 2012

(54) COMPOSITE RESIN

(75) Inventors: Herman Gerard Dikland, Sittard (NL); Jagdish Ramanlal Patel, Susteren (NL); Christopher Michael Twigg, Sittard (NL)

(73) Assignee: Lanxess Elastomers B.V., Geleen (NL)

( * ) Notice: Subject to any disclaimer, the term of this patent is extended or adjusted under 35 U.S.C. 154(b) by 468 days.

(21) Appl. No.: 12/440,345

(22) PCT Filed: Sep. 10, 2007

(86) PCT No.: PCT/EP2007/007865
§ 371 (c)(1),
(2), (4) Date: Nov. 24, 2009

(87) PCT Pub. No.: WO2008/031544
PCT Pub. Date: Mar. 20, 2008

(65) Prior Publication Data
US 2010/0076102 A1    Mar. 25, 2010

(30) Foreign Application Priority Data
Sep. 11, 2006  (EP) ..................................... 06018950

(51) Int. Cl.
*C08J 3/24* (2006.01)
*C08L 23/08* (2006.01)

(52) U.S. Cl. ............ 521/82; 521/140; 521/150; 524/16; 524/426; 524/427

(58) Field of Classification Search .................... 524/16, 524/426, 427; 521/82, 140, 150
See application file for complete search history.

(56) References Cited

U.S. PATENT DOCUMENTS

| 4,762,877 | A | * | 8/1988 | Heilbrunn | 524/432 |
| 4,857,571 | A | * | 8/1989 | Reiter et al. | 524/248 |
| 5,250,628 | A | | 10/1993 | Seguela et al. | |
| 5,569,716 | A | * | 10/1996 | Okamoto et al. | 525/192 |
| 6,569,915 | B1 | * | 5/2003 | Jackson et al. | 522/112 |
| 7,595,103 | B2 | * | 9/2009 | de Palo et al. | 428/36.9 |
| 2003/0013778 | A1 | | 1/2003 | Sueda et al. | |
| 2004/0228992 | A1 | * | 11/2004 | Giori | 428/35.7 |
| 2007/0167553 | A1 | * | 7/2007 | Westwood et al. | 524/451 |

FOREIGN PATENT DOCUMENTS

| DE | 100 84 514 | | 6/2002 |
| EP | 0 431 996 | | 6/1991 |
| EP | 1 188 785 | | 3/2002 |
| WO | WO03037981 | * | 5/2003 |

OTHER PUBLICATIONS

International Search Report for PCT/EP2007/007865, mailed Dec. 18, 2007.
Written Opinion of the International Searching Authority, mailed Dec. 18, 2007.

* cited by examiner

*Primary Examiner* — Irina S Zemel
(74) *Attorney, Agent, or Firm* — Nixon & Vanderhye P.C.

(57) ABSTRACT

The invention relates to a composite comprising a thermosetting resin with a hardness of at least 55 Shore D, wherein the resin essentially consists of an ethylene α-olefin copolymer with a density of less than 880 kg/m3, which resin is crosslinked to a degree such that the volume swelling measured in decaline after 64 hours at 23° C. is less than 50% by volume on the composite and the composite contains at least 40% by volume of a reinforcing filler, wherein the vol % of the filler is related to the volume of the resin. The composite according to the invention is an excellent isolator when at least 100 phr cork are present in the composite. A composite according to the invention can be made by crosslinking of the copolymer in the presence of a high amount of peroxide in the presence of at least 40% by volume on the resin of a filler.

6 Claims, No Drawings

COMPOSITE RESIN

This application is the U.S. national phase of International Application No. PCT/EP2007/007865, filed 10 Sep. 2007, which designated the U.S. and claims priority to Europe Application No. 06018950.3, filed 11 Sep. 2006, the entire contents of each of which are hereby incorporated by reference.

The invention relates to a composite and in particular to a composite comprising a thermosetting resin and a filler. A composite comprising a thermosetting resin and a filler is known from U.S. Pat. No. 4,824,705. This patent describes a cork filled rubber used as insulation for subsea pipelines. Subsea pipelines for transporting oil, gas and mixtures of these have to be well insulated to keep in particular the oil at a high temperature to avoid viscosity increases or even agglomeration. On the other hand a pipeline that is placed under water at great depths has to withstand the hydrostatic water pressure.

When these resins are applied for thermal insulation purposes, they can be foamed to decrease their density and thus their thermal conductivity. Foaming however generally decreases the resistance against compression of a resinous material and in particular at elevated temperatures near and above the glass transition temperature.

U.S. Pat. No. 4,824,705 describes a cork filled rubber composite with a modulus of 1000 MPa. A composite with a modulus of 1000 MPa would be able to withstand a water pressure of about 5 km. U.S. Pat. No. 4,824,705 does not describe how to increase the hardness of a rubber to a modulus of 1000 MPa without producing an extremely brittle material. A certain amount of toughness is required for a composite suitable for insulation of a deep sea pipe as these pipes are transported on large diameter reels before final installation.

It is an object of the present invention to provide a composite comprising a thermosetting resin with an improved balance of thermal insulation, resistance against compression and an improved elongation at break.

According to the invention this is obtained with a composite comprising a resin comprising an ethylene α-olefin copolymer with a density of less than 880 kg/m$^3$, which resin is crosslinked to a degree such that the volume swelling measured in decaline after 64 hours at 23° C. is less than 50% by volume on the composite and the composite contains at least 40% by volume of a reinforcing filler, wherein the vol % of the filler is related to the volume of the resin.

The composite according to the invention comprises a resin that combines an excellent insulation with a hardness of at least 55 Shore D, preferably at least 60 Shore D. This material could be made by peroxide crosslinking of an ethylene α-olefin copolymer in the presence of at least 40% by volume of a reinforcing filler.

Although it is well known that peroxide crosslinking increases the hardness of an ethylene α-olefin copolymer the amount of peroxide usually applied, is limited to about 2-4 phr as a higher amount of added peroxide results in a very brittle elastomer. Surprisingly, the addition of only 40% by volume of a reinforcing filler, followed by crosslinking to a degree such that the volume swelling measured in decaline after 64 h at 23° C. is less than 50% by volume on the composite, results in a composite with much higher elongation at break.

The resin in the composite of the invention is crosslinked to a degree such that the volume swelling of the composite measured in decaline after 64 h at 23° C. is less than 50 vol. %. Preferably the crosslinking is carried out to a degree such that such that the volume swelling measured in decaline after 64 h at 23° C. is less than 40 vol %, more preferably less than 30 vol %. This can be obtained by curing the copolymer in the presence of 20 wt % of a peroxide.

An ethylene α-olefin copolymer in this application is understood to be a copolymer of ethylene and an α-olefin, optionally comprising one or more non-conjugated polyenes.

As α-olefin is used for instance an α-olefin with 3-10 carbon atoms; examples are propylene, butylene, hexene, octene etc. Preferably, propylene is used.

The ethylene to α-olefin weight ratio in the copolymer may be between 90/10 and 20/80. Preferably, the ethylene to α-olefin weight ratio is between 70/30 and 40/60, more preferably the weight ratio is in between 60/40 and 40/60.

The resin preferably comprises a coagent. A coagent is understood to be a compound comprising one or more ethylenically unsaturated bonds. The presence of a coagent has the advantage that an even higher hardness up to a Shore D of 65 and even 70 with a lower amount of peroxide could be obtained.

Suitable coagents are for example acrylics, triallylcyanurates ethylene glycol dimethacrylate 70% on silica (EDMA), N,N'-(M-phenylene) dimaleimide (EPDM carrier) (HVA-2), 2,4,6-triallyloxy-1,3,5-triazine/$C_{12}H_{15}N_3O_3$(TAC), trimethylol propane trimethacrylate (TMPT), zinc dimethacrylate (ZDMA) and polybutapolyene. Coagents are typically added in a masterbatch in an amount of between 15 and 50 phr of the active coagent.

The use of an ethylene α-olefin copolymer, further comprising a non-conjugated polyene, also has the advantage that a higher hardness than expected on the basis of the amount of peroxide can be obtained. Examples of non-conjugated polyene are 5-ethyliden-2-norbornene (ENB), 5-vinyl-2-norbornene (VNB), dicyclopentadiene, 1,4 hexadiene or mixtures thereof. Preferably ENB is used because of its high tendency for crosslinking with a peroxide.

The non-conjugated polyene may be present in the elastomeric polymer in a amounts of 3-35 weight %, preferably 4-15 weight %. The preparation of elastomeric polymer (A) is known to the person skilled in the art. The polymer can for instance be prepared by polymerization with the help of a Ziegler-Natta catalyst or a metallocene catalyst.

The filler used in the resin of the invention is a reinforcing filler. Reinforcing fillers are chosen from the list of carbon black, silicas silicates, clais, calcium carbonate, barium sulphate, and magnesium silicate. Alternative fillers are wood flour, cellulose fibers or a mixture of these. Contrary to most inorganic fillers, these fillers have the advantage that they have a low thermal conductivity and therefore, they contribute hardly to the thermal conductivity of the composite.

The thermal conductivity can be further decreased by foaming of the resin such that a composite with a specific density of between 200 and 800 kg/m$^3$ is obtained. Foaming to a density of more than 800 kg/m$^3$ hardly contributes to an improved insulation, while foaming to a density of less than 200 kg/m$^3$ results in a foam with a too low compression strength.

Alternatively or in combination with a foamed structure of the resin, the composite may further comprise cork, preferably at least 100 phr, more preferably at least 200 phr, and even more preferably at least 300 phr of cork. Cork has the advantage that it combines a low thermal conductivity with a high compression strength, even at an elevated temperature. The addition of at least 100 phr, of cork makes it difficult to measure the Shore D of a cork comprising composite, but as long as the resin that bonds together the cork particles has a high Shore D value the composite the composite fulfils the demand of a high resistance against compression.

To increase the adhesion between cork and the α-olefin copolymer one or more compatibalisers may be added to the resin. Suitable compatibalisers are maleic anhydride grafted α-olefin copolymer and low molecular weight polybutadiene resin (e.g. Ricon 154D)

EXAMPLE I

The ingredients as listed below were mixed on a two-roll mill (that is generally used in the rubber industry). Steam was applied to both mill rolls during mixing to facilitate mixing. The distance between the rolls was adjusted to accommodate the increasing volume of material. A test plate of 6 mm thickness was cured during 12 minutes at 180° C. in a press.

| Description | phr | density | vol parts | vol % |
|---|---|---|---|---|
| KELTAN 314[1] | 100.00 | 860 kg/m$^3$. | 116 | 100 |
| Calcium carbonate | 200 | 2600 kg/m$^3$ | 77 | 66 |
| TMQ[2] | 0.75 | | | |
| ZMMBI[3] (V. ZMB 2) | 0.75 | | | |
| Perkadox 14-40 MB[4] | 9 | | | |
| TMPT | 40 | | | |

[1]Keltan is a commercial product of DSM
[2]polymerized 2,2,4-trimethyl-1,2-dihydroquinoline
[3]zinc 4(5)-methyl-2-mercaptobenzimidazol
[4]Bis(tert-butylperoxyisopropyl)benzene 40% active peroxide in silica/EPDM masterbatch The hardness of the cured plate was 71 Shore D and the density was 1152 kg/m$^3$.

EXAMPLE II

To a similar recipe as in Example I, 200 phr of cork was added. A test plate of 6 mm thickness was cured during 12 minutes at 180° C. in a press.

The density of the cured plate was 430 kg/m$^3$ and the thermal conductivity was 0.07 W/Km and the volume swelling measured after 64 hours at 23 C in decaline was 42%

The invention claimed is:

1. A foamed composite comprising a thermosetting resin with a hardness of at least 55 Shore D, characterized in that the resin essentially consists of an ethylene α-olefin copolymer with a density of less than 880 kg/m$^3$, wherein the resin is crosslinked to a degree so as to exhibit a volume swelling measured in decaline after 64 hours at 23° C. which is less than 50% by volume on the composite, wherein the composite contains at least 40% by volume, based on the volume of the resin, of a reinforcing filler, and wherein the resin exhibits a foam density of between 200 and 800 kg/m$^3$.

2. The foamed composite according to claim 1, wherein the resin further comprises a coagent.

3. The foamed composite according to claim 1, wherein the copolymer further comprises a non-conjugated polyene, preferably 5-ethyliden-2-norbornene.

4. The foamed composite according to claim 1, wherein the filler has a density of less than 1100 kg/m$^3$.

5. The foamed composite according to claim 1, further comprising a compatibaliser.

6. The foamed composite according to claim 5, further comprising at least 100 phr of cork.

* * * * *